've
(12) United States Patent
Blocher et al.

(10) Patent No.: US 8,474,129 B2
(45) Date of Patent: Jul. 2, 2013

(54) METHOD FOR PRODUCING LAMINATION PACKS

(75) Inventors: Daniel Blocher, Vaihingen (DE); Steffen Bauer, Zaberfeld (DE)

(73) Assignee: Kienle + Spiess Stanz- und Druckgiesswerk GmbH, Sachsenheim (DE)

( * ) Notice: Subject to any disclaimer, the term of this patent is extended or adjusted under 35 U.S.C. 154(b) by 1189 days.

(21) Appl. No.: 11/684,037

(22) Filed: Mar. 9, 2007

(65) Prior Publication Data

US 2007/0209175 A1  Sep. 13, 2007

(30) Foreign Application Priority Data

Mar. 10, 2006 (EP) .................................. 06075582

(51) Int. Cl.
*H01F 3/04* (2006.01)
*H01F 7/02* (2006.01)

(52) U.S. Cl.
USPC ............... 29/609; 29/607; 156/278; 156/280; 264/113; 264/153

(58) Field of Classification Search
USPC ............ 29/607, 609, 596, 830, 709; 156/278, 156/280; 427/208.6; 264/152, 153, 113
See application file for complete search history.

(56) References Cited

U.S. PATENT DOCUMENTS

| | | | | |
|---|---|---|---|---|
| 4,102,040 A | * | 7/1978 | Rich | 29/596 X |
| 4,538,345 A | | 9/1985 | Diederichs | |
| 4,728,382 A | * | 3/1988 | Raschbichler | 29/609 X |
| 5,628,861 A | * | 5/1997 | Segal | 29/609 X |
| 6,428,845 B1 | * | 8/2002 | Vesterlund | 427/208.6 |
| 2004/0135276 A1 | * | 7/2004 | Nielsen et al. | 264/113 X |

FOREIGN PATENT DOCUMENTS

| | | |
|---|---|---|
| DE | 3535573 A1 | 4/1987 |
| DE | 20318993 U1 | 4/2004 |
| GB | 1 501 676 | 2/1978 |
| JP | 55113117 A * | 9/1980 ....................... 29/609 |
| JP | 61-135348 A | 6/1986 |
| JP | 03-174927 A | 7/1991 |
| JP | 2001-321850 A | 11/2001 |
| JP | 2002-151339 A | 5/2002 |
| JP | 2005-269732 A | 9/2005 |
| WO | 97/01393 A | 1/1997 |

OTHER PUBLICATIONS

Machine Language Translation of Japanse Patent Publication JP 2001-321850.*

* cited by examiner

*Primary Examiner* — A. Dexter Tugbang
(74) *Attorney, Agent, or Firm* — Gudrun E. Huckett

(57) ABSTRACT

Lamination packs of a controlled height are produced in that laminations are punched with a tool and glue is applied partially onto at least one of an upper surface and a lower surface of each of the laminations without the application device that applies the glue contacting the laminations. Several of the laminations are then assembled to a lamination pack. Height of the lamination packs is controlled by interrupting the application of glue for certain laminations so that between some of the laminations that are stacked for assembling a lamination pack there is no glue.

15 Claims, 3 Drawing Sheets

METHOD FOR PRODUCING LAMINATION PACKS

BACKGROUND OF THE INVENTION

The invention concerns a method for manufacturing lamination packs in a tool for punching laminations onto which laminations glue is applied and which laminations are assembled to a lamination pack. The invention also concerns a tool for producing lamination packs according to said method and an apparatus for producing lamination packs according to said method.

Electrical machines often use cores of stacked laminations that are manufactured from cut electrical sheets. Typically, a punching press is used in order to cut the individual laminations. The manufacture of the core or of the pack can be done in several ways, including mechanical joining of the parts in the press for forming the cores, welding, gluing, or mechanical joining of the laminations into packs outside of the press.

Examples of prior patents in the field of manufacturing packs outside of tool and press are disclosed in GB 1 501 676. This reference discloses how packs of steel having a heat-activated coating are produced. U.S. Pat. No. 4,538,345 discloses as a solution a process in which the laminations are provided with projections and depressions by means of which the laminations are compressed to form the pack. This so-called interlocking process has several disadvantages:

(a) The interlocking technique requires manufacture of very complex tools whose parts are very sensitive with regard to material quality and are less robust than tools not to be used for interlocking laminations. This increases the costs as well as the risks associated with the method; this may diminish its usefulness.
(b) Very thin sheet steel, for example, less than 0.35 mm thick, is difficult to interlock and this leads to low efficiency methods.
(c) Some products require that each lamination be rotated by a certain amount. In the case of a pack whose laminations are to be interlocked the angle of rotation is limited by the number of existing interlocking locations, i.e., in the case of four existing interlocking locations the smallest possible angle of rotation is 90 degrees.
(d) A further disadvantage of the present interlocking technique resides in that materials of different thickness or properties (often characterized by different quality specifications) cannot be joined.

Other techniques that employ an externally applied adhesive have also been tried. DE 35 35 573 and DE 203 18 993 are examples therefore and both disclose a method for employing an adhesive that is applied onto the strip surface. The utilization of capillary gluing, i.e., allowing a glue "seam" to run down an outer edge of the pack, has also been tried.

Various problems are associated with the various existing techniques for applying an adhesive onto the strip surface when used as an integral part of the core manufacture.

(a) The possible press speeds are limited by the speed of application of the adhesive. For example, DE 203 18 993 defines speed ranges up to 200-300 strokes per minute. For an inexpensive core production, the press speeds must be at least at 400 strokes per minute; typically, values of above 600 strokes per minute are very desirable.
(b) It is difficult to keep the tool clean. For example, in one of the techniques a batch size limit of a few thousand strokes is probable; thereafter, the tool must be serviced and cleaned. The normal servicing interval for a carbide tool is a minimum of 2,000,000 strokes. Shorter operating times drive up the production costs significantly.
(c) Existing systems as disclosed in DE 20 31 899 are known to have problems in regard to wear of the parts.
(d) The packs that are produced by means of some adhesive techniques can have variable/unreliable strengths of the pack.
(e) The cost of tools with integrated application units can be significantly higher than the cost of standard tools.
(f) The technology of an application system integrated into a tool can normally not be used in connection with already existing tools.

Items (a), (b), and (c) all relate to the fact that the application of the adhesive is based on contact between the application unit and the strip.

An advantage provided by gluing relative to other joining technologies resides in that between the laminations in a pack there is no electrical contact. With techniques such as interlocking or welding a contact is produced. This increases possible loss in the completed motor, in particular at high frequencies. A reliable gluing method would have two benefits: Either the efficiency of the motor is improved for a given pack size or a smaller motor could be used to achieve the same output as a larger pack that is welded or interlocked or manufactured by another contacting joining method.

Another problem that can occur during punching of the lamination parts is the release of pieces of material, often referred to as "scrap metal", that fall back into the cutting area of the tool. This can cause the tool to be damaged; in turn, this leads to downtime when the tools must be repaired.

SUMMARY OF THE INVENTION

The invention enables the manufacture of packs of sufficiently high strength as an integrated part of the pressing operation at economically competitive speeds.

In the present invention, the incoming material is fed into a roller leveler, then into a feeder, then into the press and subsequently into the tool. The raw material of the process is usually supplied in the form of endless strip material rolled to coils; however, it is also possible to use cut strips of defined length. Each material thickness that can be punched by a press can be joined when using this technique. Especially thin materials, usually having a thickness of less than 0.5 mm, benefit from using a gluing method as a joining technique because of the reduction in regard to precision of the tools and machines that usually is required for such thin materials.

Materials of various quality, thickness, properties and coating can be processed with the method. It is even possible to join materials of different quality, thickness, properties, and coating within the same pack. It is also possible that within one lamination pack the top lamination and the bottom lamination are produced from a material having different quality or material thickness relative to the remainder of the laminations in the lamination pack.

In this process, the adhesive is distributed in small dots onto the upper and/or lower surface of the strip. The application device does not contact the strip. The environment within the tool and the press can therefore be kept cleaner. The device itself facilitates a sputtering-type application of the adhesive from a distance. The size of each glue dot (amount of glue) is controlled by the application device. The number of dots employed for each part can be varied in order to, if desired, enable variations of the pack strength.

The adhesive can be applied in front of the tool (within the press) by means of an external equipment or within the tool itself by means of an integrated system. There are several possibilities as to where exactly the adhesive is to be applied.

The dots of adhesive are applied such that they are positioned on the punched lamination at suitable locations for the pack arrangement. When the application system is arranged somewhere in front of the pack assembly and the curing position of the glue, a change of the tool is required in order to prevent that the glue dots are contacted and thus damaged by the tool before the pack is assembled. The present invention enables the production of very small or complex parts by utilizing the gluing technique because only very small cutouts in the punch, the stripper plate or the die surface are required.

The strip is punched into individual laminations with glue dots at suitable locations. The pack is joined in the die. The pressure of the last punching step and a restrictor ensure a good connection between each lamination. This high pressure is essential for a uniform curing of the glue which, in turn, provides for a uniform pack strength across the laminations.

One option is to control dispensing of the glue such that dispensing is interrupted when a new pack is to be started. This control can be linked to the press control, for example, in that dispensing of glue dots is prevented after a preset number of punches has been performed. This would result in laminations being produced without glue and thus would facilitate the start of a new pack in the restrictor.

A clear advantage of the inventive technique is that it does not rely on a physical connection for joining the parts. Therefore, the rotation of subsequent laminations can be realized at any angle required by the product.

It is possible to use the gluing technique to apply dots of glue to areas of the strip that will not appear on the finished lamination. This process could be used for part shapes that, when punched, create scrap parts that could exit the die and return into the tool thus creating potentially long-term breakdowns. Although the glue is not fully cured during the earlier stages of punching, the bonding action between the individual scrap parts is sufficient to prevent the scrap parts from returning into the tool. This problem relates both to certain materials and also certain shapes. Therefore, the present invention greatly increases the number of pack types that can be assembled within a tool.

One variant of this technology enables retrofitting of existing multistage operation dies that have been designed only to produce loose laminations, thus allowing utilization of the invention without the cost of building a new tool. The invention therefore changes a tool for loose laminations into a tool for manufacturing lamination packs. Such tools for producing lamination packs previously could be used only in connection with interlocking technology.

The cost of manufacturing a new tool with the inventive technology are significantly lower than the cost for a tool that is used for interlocking laminations to form a pack. This is due to a reduction in the required total tool length and due to the reduced number of required interlocking elements on the laminations. These simple tools can also be used in presses with a shorter bed and enable lower operating and setup costs. The reduction in active parts of the press leads to lower service and repair costs.

The only limits in regard to speed to which a press is subject when using this technology are the speed of the glue application system and the curing time of the adhesive in the restrictor. A longer restrictor allows for a longer glue curing time, if necessary. Therefore, this technology offers the possibility of operating presses at far more attractive speeds than possible with other interlocking technologies.

BRIEF DESCRIPTION OF THE DRAWINGS

In order to assist in understanding the description of one embodiment according to the invention, the following drawings are provided.

Figures 1, 2:
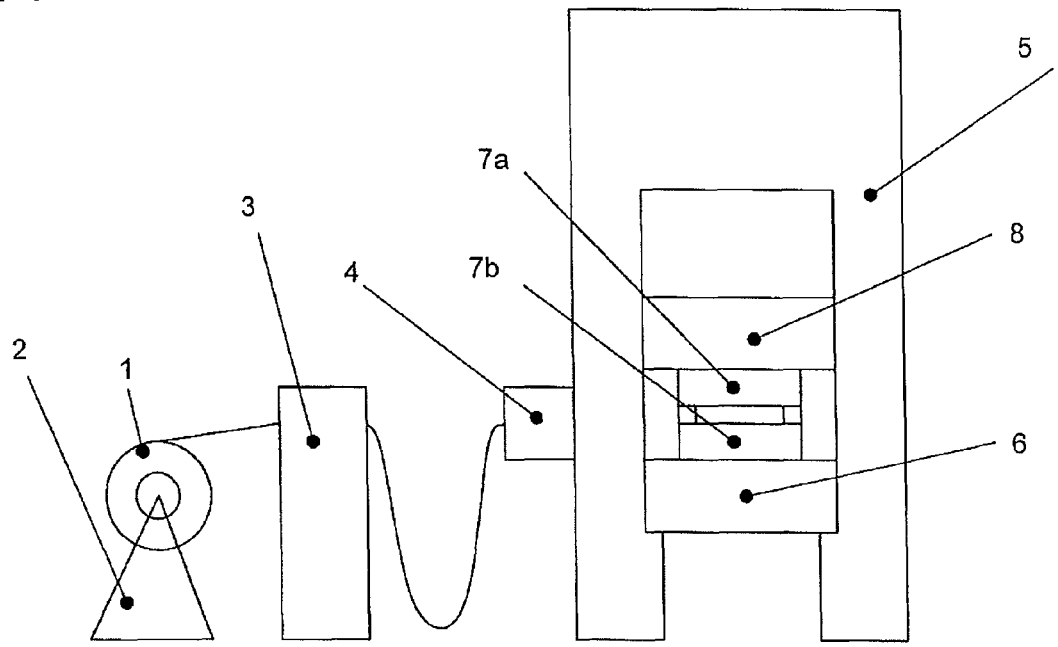
FIG. 1 shows a schematic diagram of punching press with a tool for the manufacture of lamination stacks.
FIG. 2 is a drawing showing important functional locations in the tool.

DESCRIPTION OF PREFERRED
EMBODIMENTS OF THE INVENTION

In the following, a detailed description of how this technology could be implemented is provided. The drawings to which reference is being had are the above mentioned FIGS. 1 to 6. All reference numerals are shown in the drawings.

FIG. 1 shows a schematic diagram of a punching press. The coil of raw material 1 is arranged on the uncoiler 2. It is shown how the strip material is guided through a roller leveler 3 and then into the feeder 4 and into the press housing 5. The tool sits on the press table 6 and is comprised of two parts, the upper part 7a and the lower part 7b. The upper arm of the press 8 moves up and down to effect punching of the strip into laminations.

Some more details of the arrangement of the key elements inside the press housing are indicated schematically in FIG. 2. In this embodiment, the application unit is located at the front of the tool and can be attached either to the upper 7a or lower 7b part of the tool. The applicator valve operates in a non-contact fashion, preferably based on piezo technology.

Onto the strip-shaped raw material 1 the adhesive in the form of glue dots 16 is applied before it enters the press 8 and tool 7 or the space between the upper part 7a and the lower part 7b.

The press 8 is connected to a control unit 9 that sends a control signal 10 for each stroke of the press to a control system 11 of a glue application unit 12. The signal in the glue application control system 11 sends an electric current to a piezo crystal that then activates an actuator connected to the valve that controls the glue application. The valve opens for a short, fixed period of time and the glue 13 is applied under pressure onto the strip surface. In the embodiment, the applicator head 14 can have a spacing of between approximately 0.1 mm to approximately 5 mm from the strip surface. The timing of the signal is very important. Precise timing is required so that the adhesive (glue) is applied during the correct part of the press stroke when the material is temporarily at rest. The glue itself is stored in a tank 15 adjacent to the press. Pressure can be used to assist in conveying the adhesive from the tank to the applicator head. The freshly applied glue dots 16 (FIG. 4) are then positioned either on the upper 17a or lower 17b surface of the strip 1. More than one application system for applying the glue dots to the strip are conceivable. Whichever valve system is used, it must ensure that the glue is applied onto the target locations on the strip.

The application unit 12 must not receive its signals from the press control unit 9; it can also receive its signals from another control unit.

Figure 3:
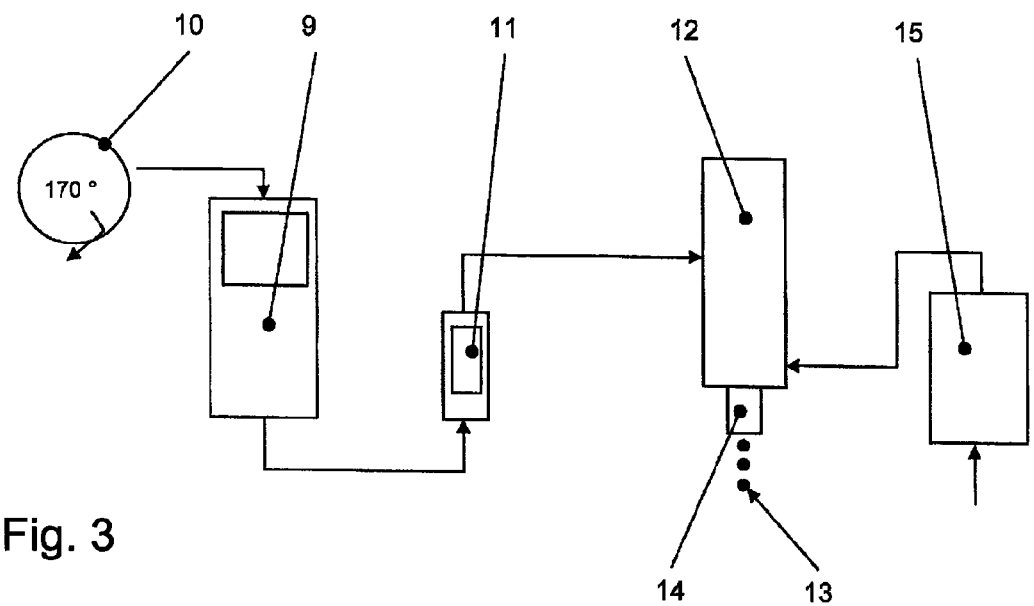
FIG. 3 shows a detail of one possible arrangement of the application system.
Figure 4:
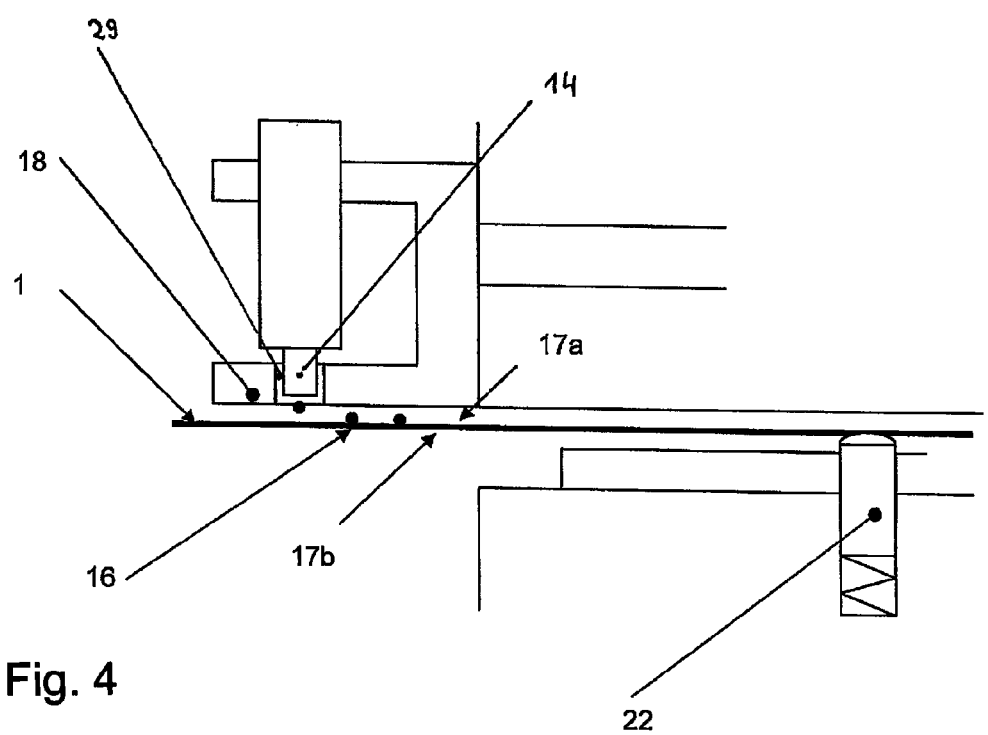
FIG. 4 is a schematic illustration of the application options and of the application guide plate.

The number of applied glue dots required for a lamination depends on several factors, including the size of the lamination, its shape, and the required pack strength. If gluing is done outside the tool, as in the embodiment depicted in FIG. 4, it is necessary to calculate the required position of the glue application with respect to the position of the punched part in the tool. The application arrangement is set for a given lamination design in terms of the number of required applicator heads. Then, relative to the tool, a transfer back from the tool by a set number of "progression steps" is done wherein one progression step is the distance by which the material moves with each stroke of the press. In this way, the location of the glue applied outside of the tool relative to the part inside the tool can be safely determined. The application unit 12 is attached to the tool by a support fixture. This support fixture remains attached to an individual tool and is designed to hold the application unit in the correct position for that tool. However, the application unit itself can be removed from the support fixture and can thus be used with any other tool. A backplate 18 can be integrated into the fixture to assist with positioning of the glue dot. The backplate 18 has at least one opening 29 engaged by the applicator head 14. The strip-shaped raw material 1 moves underneath the back plate 18. The glue dots 16 exiting in the form of glue drops (as indicated in FIG. 3) from the applicator head 14 reach the top side of the strip-shaped raw material 1. In addition to applying glue in order to facilitate pack assembly, glue dots can be used to ensure that scrap parts that could return into the tool, are removed from the tool after punching.

The application unit 12 can be arranged in front of the tool or within the tool.

Figure 5:
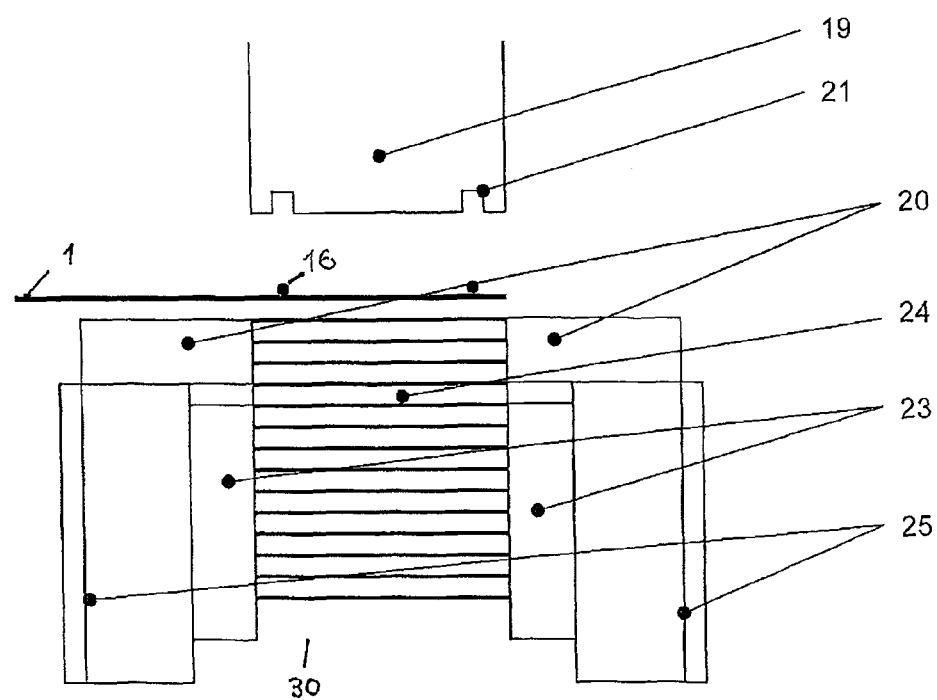
FIG. 5 is a schematic illustration depicting the modifications made on the tool as part of the inventive technique and the restrictor used for assembling the punched stacks, a manufactured pack part being shown therein.

In the embodiment where the glue is applied in front of the tool, the glue dots move into the tool with a progressive movement of the strip. The upper part 7a and the lower part 7b of the tool are designed such that a contact between the glue dots and parts of the tool is prevented as the strip moves through the press. FIG. 5 shows this in more detail. The modification can take the form of small cutouts 21 in the face of the stripper plate or of the punch 19 (if the glue is applied to the top surface) or in the face of the die 20 (if the glue is applied to the bottom surface). It is also possible to use of a continuous channel within the tool. However, this has the disadvantage that it is not possible to provide channels across very small or complex parts. Therefore, small cutouts 21 that are only slightly larger than the glue dots themselves are preferred. As the strip 1 moves through the press, cutouts accommodate the glue dots. The cutouts 21 are of such a size that the tool during the punching process does not touch the glue dots 16. In this way it is ensured that the punched laminations do not stick to the tool. The arrangement of the cutouts depends on the arrangement of the glue dots 16 of the lamination to be punched. If the glue is on the top surface, it is not touched because the stripper plate is lifted between every stroke of the press. If the glue is on the bottom surface, contact is avoided by strip lifting springs 22 that lift the strip from the tool surface for each movement of the strip. The strip lifting springs 22 are provided in such a way that they do not contact during the lifting step the glue dots 16 on the strip-shaped raw material.

A lamination is punched in several stages. In the last stage the lamination is separated from the rest of the strip. This takes place above the restrictor 23. The pack is assembled in the restrictor. The restrictor 23 is arranged within a shaft-like chamber 30 in which the laminations 24 are assembled to packs. In order to prevent the punched laminations from dropping through the shaft 30, the restrictor 23 is provided. For example, it can be comprised of partial rings whose inner diameter is somewhat smaller than the outer diameter of the punched laminations. In this way, the laminations 24 are secured by the restrictor 23 in the shaft 30. The punch 19 presses after each punching step the next lamination onto the lamination positioned within the shaft 30. The braking force applied by the restrictor 23 is so great that when the next lamination, respectively, is pressed onto the already formed part of the pack, a safe bonding of the laminations 24 resting on one another is ensured. The force applied by the punch 19 is uniform across the lamination. Therefore, a uniform contact across the lamination as well as a high pressure that is beneficial for a uniform bonding action, are present. The time available for curing depends on the spacing of the die 20 from the end of the restrictor.

The longer the restrictor 23 in the longitudinal direction of the shaft 30, the longer the residence time of the compressed laminations 24 within the restrictor 23. Therefore, there is more time available for curing of the glue.

To enable a relative rotation of individual laminations 24 within the pack structure, the die can be constructed such that it can be rotated with each stroke of the press. There are many systems available for achieving this goal. One example is the use of a system of wheel and belt. By means of such a wheel-belt system, the die 20 can be rotated with the restrictor 23 about the longitudinal axis. Since the partial pack is secured in the restrictor 23, that pack is also rotated about the corresponding angle in this way. The rotation is done before the next punched lamination is pressed by the punch 19 onto the partial pack positioned in the restrictor 23. Since the individual laminations are not positively locked to one another by pegs, partially punched tongues and the like, the angle of rotation can be matched optimally to the intended use of the lamination pack. Any angle of rotation and thus helix angle is possible because there are no physical limitations as to how the laminations fit together. This is in contrast to interlocking systems in which the laminations in the pack are fixedly connected to one another by pegs, tongues or the like (interlocking technology).

Figure 6:
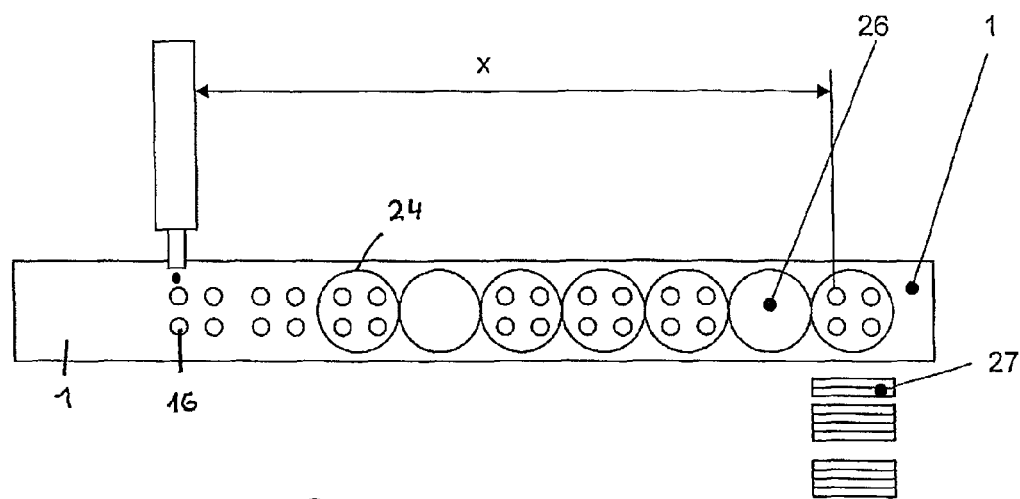
FIG. 6 is a schematic illustration of the equipment required for producing cores of predetermined length.

Using the embodiment described herein, there are several methods of ensuring the desired pack length based on this technique. With the aid of FIG. 6 one possibility is described as to how the supply of glue to the strip can be interrupted at fixed intervals. FIG. 6 shows the strip-shaped raw material 1 onto which the glue dots 1616) are to be applied. As an example, for each lamination 24 four glue dots 16 are provided. The laminations provided with the glue dots are assembled in the shaft 30 (FIG. 5) to the pack 27 (FIG. 6). In this case, the supply of glue to the strip 1 is interrupted at fixed intervals. In this way, laminations are generated that have no glue dots 16 at their topside 26. These laminations do not adhere to the preceding lamination in the die. By means of these laminations that are not provided with glue dots the height of the pack 27 is determined. Since in the illustrated embodiment each fourth laminations has no glue dots, packs 27 are formed in the shaft 30 that are comprised of 4 stacked laminations. At the moment when the lamination that is not provided with glue dots is pressed onto the top laminations of the partial pack, the pack 27 has the desired height and is later on pushed out of the shaft 30 in a way known in the art and is fed to a transport device with which this pack is transported away. In the shaft 30 the next pack of four laminations is now formed. As soon as this partial pack receives the lamination that is not provided with glue dots, the pack has again reached the desired height and is pushed out. In this way, it is possible to determine the pack height in a simple way.

The laminations that are not provided with glue dots must not be punched in uniform time intervals from the sheet metal 1. The glue application can be controlled such that the interruption of the glue supply is realized at different time intervals. Accordingly, the number of laminations in the pack 27 that are provided with glue dots can be greater in one situation and smaller in another.

The specification incorporates by reference the entire disclosure of European priority document 06 075 582.4 having a filing date of Mar. 10, 2006.

While specific embodiments of the invention have been shown and described in detail to illustrate the inventive principles, it will be understood that the invention may be embodied otherwise without departing from such principles.

What is claimed is:

1. A method for producing lamination packs of a controlled height, the method comprising the steps of:
   supplying raw material to a press having associated therewith a glue application device, wherein the glue application device is comprised of several glue application units each having a control system, wherein the glue application units each comprise a valve and an actuator, connected to the valve and controlled by the control system;
   applying glue partially onto an upper surface; a lower surface; or an upper surface and a lower surface of the raw material without the raw material being contacted by the glue application device that applies the glue, wherein the glue is applied by the several glue application units in the form of several glue dots, with each one of application units producing one of the glue dots;
   supplying to the control systems a control signal for each stroke of the press;
   varying the number of the glue dots per lamination for varying a lamination pack strength;
   immediately after applying the glue, punching laminations from the raw material with a tool of the press such that the tool does not contact the glue dots applied to the raw material;
   assembling several of the laminations to a lamination pack.

2. The method according to claim 1, wherein the application device employs piezo technology.

3. The method according to claim 1, further comprising the step of supplying raw material for producing the laminations as a continuous strip from a coil.

4. The method according to claim 1, further comprising the step of supplying raw material for producing the laminations in the form of individual sheets.

5. The method according to claim 1, wherein, in the step of applying glue, said several glue dots are applied in positions selected appropriately for assembling the lamination pack.

6. The method according to claim 1, wherein, in the step of applying glue, an amount of glue that is applied is varied.

7. The method according to claim 1, wherein, in the step of applying glue, two or more metered glue drops are applied onto each of the laminations.

8. The method according to claim 1, wherein, in the step of assembling, the laminations are rotated relative to one another by an angle of rotation so that the lamination pack being produced is a helical pack having a helix angle determined by the angle of rotation.

9. The method according to claim 1, wherein the laminations are made from materials of different quality, thickness, properties, and coating.

10. The method according to claim 9, wherein the laminations made from materials of different quality, thickness, properties, and coating are combined to form the lamination pack.

11. The method according to claim 1, wherein small cutouts are provided in the tool in order to accommodate the applied glue.

12. The method according to claim 1, wherein, in the step of assembling, the laminations are placed into an assembly chamber and a restrictor is inserted into the assembly chamber.

13. A method for producing lamination packs of a controlled height, the method comprising the steps of:
   supplying raw material to a glue application device;
   applying glue partially onto an upper surface; a lower surface; or an upper surface and a lower surface of the raw material without the raw material being contacted by the glue application device that applies the glue, wherein the glue is applied so that a discontinuous glue area is formed;
   immediately after applying the glue, punching laminations from the raw material with a tool such that the tool does not contact the glue applied to the raw material;
   assembling several of the laminations to a lamination pack;
   wherein onto portions of raw material supplied for punching the laminations which do not form part of the laminations and become scrap material, glue is applied in order to facilitate removal of the scrap material from the tool.

14. A method for producing lamination packs of a controlled height, the method comprising the steps of:
   supplying raw material to a glue application device;
   applying glue partially onto an upper surface; a lower surface; or an upper surface and a lower surface of the raw material without the raw material being contacted by the glue application device that applies the glue, wherein the glue is applied so that a discontinuous glue area is formed;
   immediately after applying the glue, punching laminations from the raw material with a tool such that the tool does not contact the glue applied to the raw material;
   assembling several of the laminations to a lamination pack;
   wherein the step of applying glue is periodically interrupted so that between some of the laminations to be assembled there is no glue leading to lamination packs of different heights being assembled in the step of assembling.

15. The method according to claim 14, wherein the step of applying glue is interrupted by an internal signal or an externally generated signal.

* * * * *